H. DEVLIN.
TRANSMISSION MECHANISM.
APPLICATION FILED SEPT. 25, 1912.

1,072,834.

Patented Sept. 9, 1913.
2 SHEETS—SHEET 1.

Witnesses
Chas. W. Stauffiger
A. M. Shannon

Inventor
Henry Devlin,
By
Attorney

H. DEVLIN.
TRANSMISSION MECHANISM.
APPLICATION FILED SEPT. 25, 1912.

1,072,834.

Patented Sept. 9, 1913.

2 SHEETS—SHEET 2.

UNITED STATES PATENT OFFICE.

HENRY DEVLIN, OF BAY CITY, MICHIGAN, ASSIGNOR TO THE M. GARLAND COMPANY, OF BAY CITY, MICHIGAN, A CORPORATION OF MICHIGAN.

TRANSMISSION MECHANISM.

1,072,834.  Specification of Letters Patent.  Patented Sept. 9, 1913.

Application filed September 25, 1912. Serial No. 722,219.

*To all whom it may concern:*

Be it known that I, HENRY DEVLIN, a citizen of the United States of America, residing at Bay City, in the county of Bay and State of Michigan, have invented certain new and useful Improvements in Transmission Mechanism, of which the following is a specification, reference being had therein to the accompanying drawings.

This invention relates to speed reduction mechanism which is perfectly balanced in action, is very compact and can be used where it is necessary to transmit power in large units.

The invention consists in the matters hereinafter set forth and pointed out in the appended claims.

Figure 1:
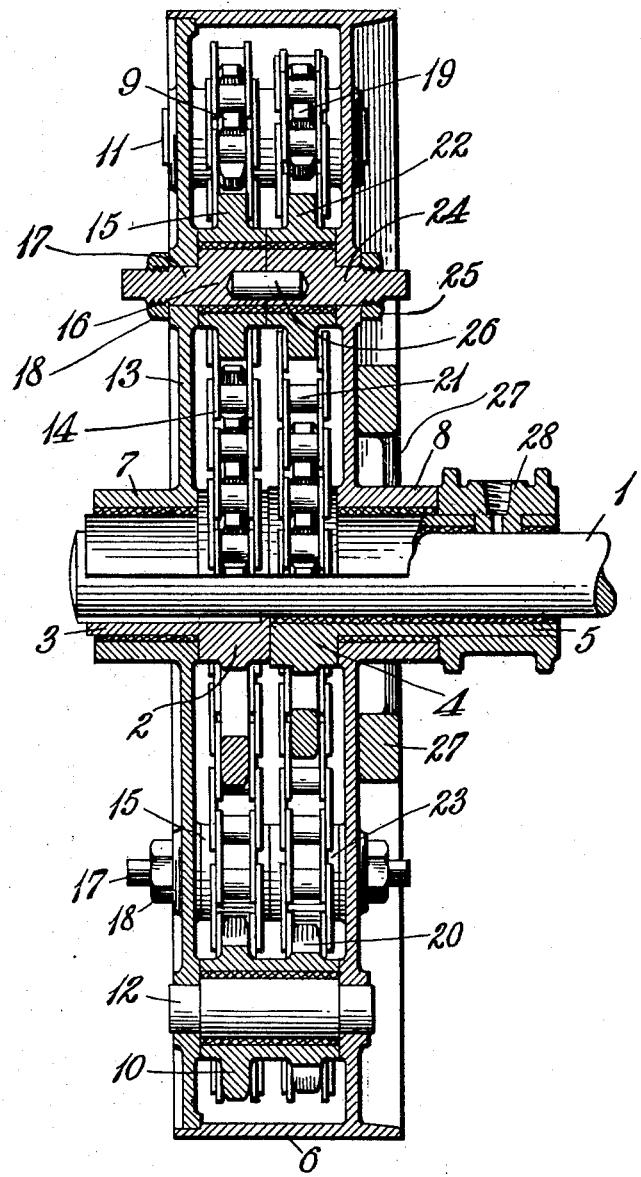
Figure 2:
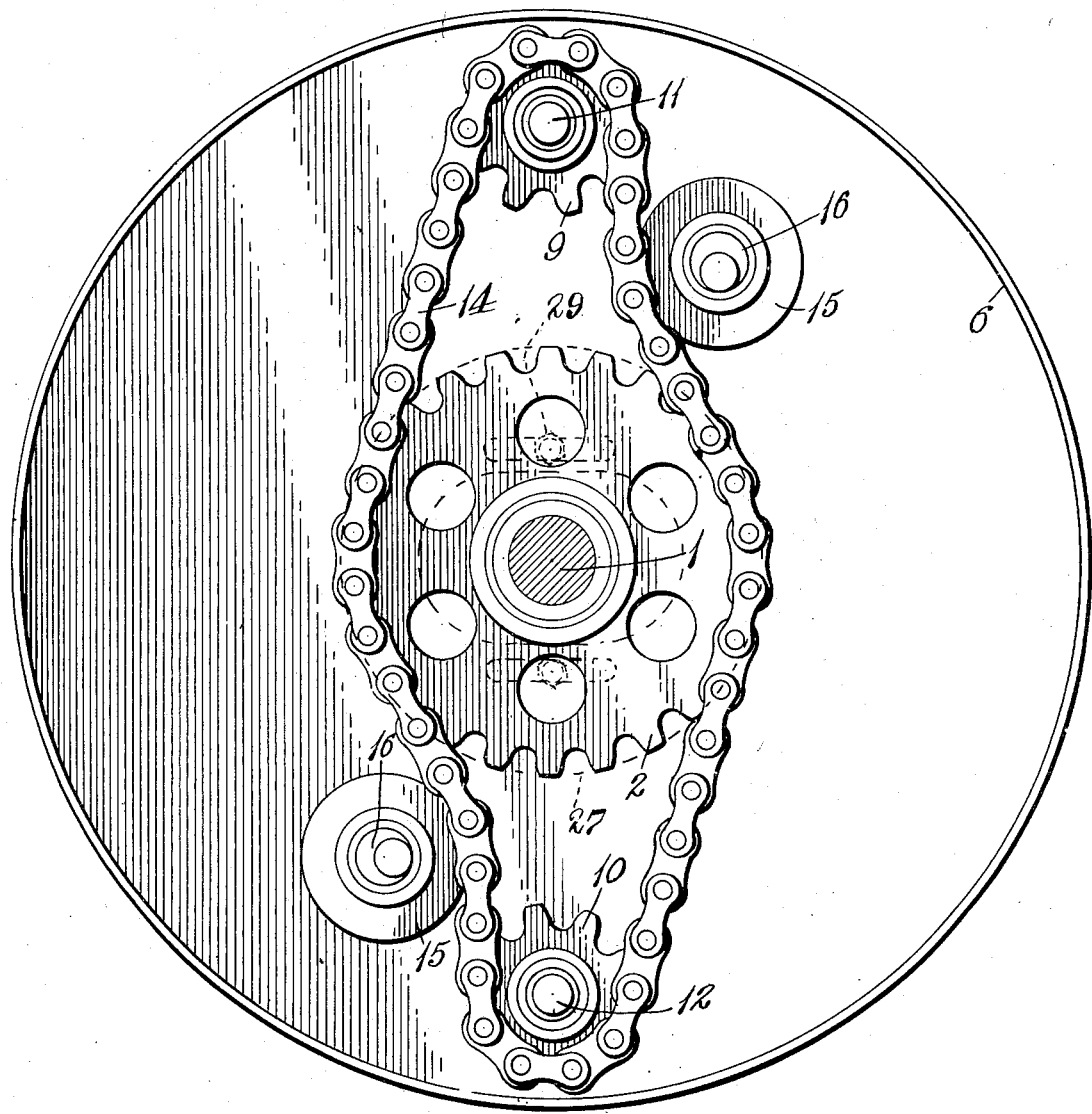

In the drawings, Figure 1 is a view in longitudinal section of a device that embodies features of the invention; and Fig. 2 is a view in end elevation of a device with a portion of the casing removed.

As herein shown in preferred form a shaft 1 carries a main sprocket wheel 2 which is keyed or otherwise made fast thereto. The sprocket has an outwardly extending elongated hub 3 and abuts a sprocket wheel 4 that is journaled on the shaft, and has an outwardly extending hub or sleeve 5. A cylindrical casing or drum 6 has oppositely disposed bearing bosses 7 and 8 whereby it is journaled on the hub 3 and sleeve 5 as a housing for the wheels 2 and 4 which it incloses. A pair of planetary sprocket wheels 9 and 10 are journaled on suitable studs 11 and 12 in one end plate 13 of the drum 6 to revolve around the shaft in the plane of rotation of the wheel 2 with which they are operatively connected by an endless sprocket chain 14 that is held to its work by similarly disposed idlers 15. The idlers 15 are journaled on studs 16 which are eccentrically adjustable on pins 17 passing through the plate 13, jam nuts 18 holding them in adjusted position. The planet wheels 9 and 10 are each two part, the members 19 and 20 of which are alined with and revolve around the sprocket wheel 4. An endless chain 21 operatively connects the latter with these members, idlers 22 and 23 holding the chain to its work. The idlers are mounted on eccentrically adjustable studs 24 with holding nuts 25, steady pins 26 being used preferably to insure axial alinement of the latter studs with the studs 16 on the other side of the casing. A counterbalance collar 27 is secured on one face of the casing around the shaft 1, clamping studs that engage slots in the collar 27 permitting the shifting of the latter to obtain the desired balance of the parts. A bearing 28 for the shaft interlocks with the hub 5 and prevents rotation thereof.

By giving the proper proportionate diameters to the two members of the planetary wheels, the mechanism may be made to transmit power applied either to the drum from the shaft with increased or reduced velocity or may be used to transmit power applied to the casing or hubs thereof to the shaft and to drive the latter at increased or reduced speed in relation to the revolutions of the casing. As the driving strain on each chain is applied at opposite portions of the latter between the main and planetary sprockets, each chain is in effect capable of transmitting a double load so that the device while perfectly balanced may be made very compact without decreasing its efficiency as a transmission mechanism. Because of the symmetrical arrangement which may be made of the parts it is extremely easy to keep the assembled structure in running balance. The device is easily assembled and is not liable to derangement or breakage even under heavy load.

Obviously, changes in the details of construction may be made without departing from the spirit of my invention and I do not care to limit myself to any particular form or arrangement of parts.

What I claim is:—

1. In speed reduction mechanism, a bearing, a shaft journaled therein, a main sprocket wheel secured on the shaft, a sprocket wheel journaled on the shaft and held by the bearing from rotating, a cylindrical casing journaled on the shaft as a housing for the wheels, a pair of planetary sprocket wheels journaled in the casing in diametrically opposite relation and each provided with a pair of members each in the plane of rotation of a sprocket, endless chains each passing around the corresponding members of the planetary pinions and engaging a sprocket and diametrically opposite idlers on the casing for holding the chains in operative relation to the sprockets.

2. In speed reduction mechanism, a bearing, a shaft journaled therein, a main sprocket wheel secured on the shaft, a sprocket wheel journaled on the shaft adjacent the main sprocket wheel and held by the bearing from rotating, a cylindrical casing rotatably secured on the shaft as a housing for the sprocket wheels, a pair of planetary sprocket wheels journaled in the casing in diametrically opposite relation and each provided with a pair of members each lying in the plane of rotation of a sprocket wheel, endless chains each passing around corresponding members of the planetary sprockets, and engaging the companion sprocket wheel, diametrically opposite idler sprockets journaled on the casing, and means for shifting the idlers into engagement with the chains.

3. In speed reduction mechanism, a bearing, a shaft journaled therein, a main sprocket wheel secured on the shaft, a sprocket wheel journaled on the shaft adjacent the main wheel and held by the bearing from rotating, the wheels provided with outwardly extending hubs, a cylindrical casing journaled on the hubs as a housing for the wheels, a pair of planetary sprocket wheels journaled in the casing in diametrically opposite relation and each provided with a pair of members each lying in a plane of rotation of a sprocket wheel, endless sprocket chains each passing around corresponding members of the planetary wheels and engaging the companion sprocket wheel and a pair of diametrically opposite idlers for each chain adjustably mounted on the casing for holding the chains in engagement with the companion sprocket wheels.

4. In speed reduction mechanism, a bearing, a shaft journaled therein, a main sprocket wheel secured on the shaft, a sprocket wheel journaled on the shaft adjacent the main wheel and held by the bearing from rotation, the wheels provided with outwardly extending hubs, a cylindrical casing journaled on the hubs as a housing for the wheels, a pair of planetary sprocket wheels journaled in the casing in diametrically opposite relation and each provided with a pair of members each lying in a plane of rotation of a sprocket wheel, endless sprocket chains each passing around corresponding members of the planetary wheels and engaging the companion sprocket wheel, a pair of bearing studs eccentrically adjustable in the casing in diametrically opposite relation, a pair of idlers journaled on the studs and engaging one of the chains, a pair of bearing studs eccentrically adjustable in the casing in axial alinement with the other studs, steady pins holding the adjacent studs in axial alinement, and idlers on the latter studs engaging and holding the companion chain in operative relation to the companion sprocket wheel.

In testimony whereof I affix my signature in presence of two witnesses.

HENRY DEVLIN.

Witnesses:
HAROLD CATES,
H. W. GARLAND.